US008612474B2

(12) United States Patent
Lee et al.

(10) Patent No.: US 8,612,474 B2
(45) Date of Patent: Dec. 17, 2013

(54) SYSTEM AND METHOD FOR SUPPORTING LOGICAL SENSOR NETWORK

(75) Inventors: Ki Sung Lee, Daejeon (KR); Jun Wook Lee, Chungcheongbuk-do (KR); Jae Gak Hwang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 517 days.

(21) Appl. No.: 12/876,655

(22) Filed: Sep. 7, 2010

(65) Prior Publication Data

US 2011/0113339 A1 May 12, 2011

(30) Foreign Application Priority Data

Nov. 11, 2009 (KR) .................. 10-2009-0108432

(51) Int. Cl.
*G06F 17/30* (2006.01)

(52) U.S. Cl.
USPC ............................ 707/769; 715/736; 709/245

(58) Field of Classification Search
USPC .......... 707/702, 769; 709/224, 219, 230, 245; 715/736
See application file for complete search history.

(56) References Cited

U.S. PATENT DOCUMENTS

| 7,119,676 | B1 * | 10/2006 | Silverstrim et al. ........... 340/531 |
| 7,395,195 | B2 | 7/2008 | Suenbuel et al. |
| 8,254,581 | B2 * | 8/2012 | Wan et al. ..................... 380/278 |
| 8,289,184 | B2 * | 10/2012 | Strohm .................... 340/870.07 |
| 8,373,576 | B2 * | 2/2013 | Strohm .................... 340/870.07 |
| 2002/0099854 | A1 * | 7/2002 | Jorgensen ..................... 709/249 |
| 2003/0050055 | A1 * | 3/2003 | Ting et al. ...................... 455/419 |
| 2003/0061344 | A1 * | 3/2003 | Monroe ......................... 709/224 |
| 2003/0154262 | A1 * | 8/2003 | Kaiser et al. .................. 709/219 |
| 2003/0158954 | A1 * | 8/2003 | Williams ....................... 709/230 |
| 2005/0021724 | A1 * | 1/2005 | Kung et al. .................... 709/223 |
| 2006/0190458 | A1 * | 8/2006 | Mishina et al. ................. 707/10 |
| 2012/0246341 | A1 * | 9/2012 | Merk ............................ 709/245 |
| 2013/0094403 | A1 * | 4/2013 | Park et al. ..................... 370/255 |
| 2013/0159357 | A1 * | 6/2013 | Yoo et al. ..................... 707/812 |

FOREIGN PATENT DOCUMENTS

| KR | 10-2005-0005800 | 1/2005 |
| KR | 10-2007-0105525 | 10/2007 |
| KR | 10-2009-0054180 | 5/2009 |

* cited by examiner

*Primary Examiner* — Jean M Corrielus
(74) *Attorney, Agent, or Firm* — Staas & Halsey LLP

(57) ABSTRACT

Provided are a system and method for supporting a logical sensor network (LSN) separate from an actual physical sensor network (PSN) to readily obtain sensing data required by a user or application program in an environment consisting of various types of PSNs. The system includes a metadata database (DB) for storing metadata of a plurality of available PSNs each having a plurality of sensor nodes, a LSN generation module for generating a LSN including one or more PSNs among the PSNs registered in the metadata DB or one or more sensor nodes in the PSNs, and storing metadata of the generated LSN in the metadata DB, a LSN update module for updating the metadata of the LSN including the PSNs or the sensor nodes in the PSNs when a state of the PSNs or the sensor nodes is changed, and a query processing module for, when a query about the LSN is received from an application program, collecting sensing data from the PSNs or the sensor nodes included in the LSN, generating query result data for the LSN using the collected data, and providing the query result data to the application program.

15 Claims, 5 Drawing Sheets

SYSTEM AND METHOD FOR SUPPORTING LOGICAL SENSOR NETWORK

CROSS-REFERENCE TO RELATED APPLICATION

This application claims priority to and the benefit of Korean Patent Application No. 10-2009-0108432, filed Nov. 11, 2009, the disclosure of which is incorporated herein by reference in its entirety.

BACKGROUND

1. Field of the Invention

The present invention relates to a system and method for supporting a logical sensor network (LSN), and more particularly to a system and method for supporting a LSN separate from a physical sensor network (PSN) to readily obtain sensing data required by a user or application program in an environment consisting of various types of PSNs.

2. Discussion of Related Art

With the development of sensor network technology, various types of sensor networks are being developed, and application fields of the technology are being diversified. Thus far, one application program has obtained required data using only one sensor network in most cases. However, as demands of application programs (e.g., an application program for metropolitan air atmosphere monitoring) that are more intelligent and manage a wide area increase, one application program frequently uses a plurality of sensor networks.

It is very difficult for a user or application program to directly use different types of multiple sensor networks because details of all the sensor networks should be recognized and programs for the respective sensor networks should be separately developed. To solve this difficulty, middleware that supports abstracting of sensor networks and query processing has been suggested. Due to the middleware, a user or application program can use different types of sensor networks without considering details of the respective sensor networks. Also, a user or application program can request sensing data from various sensor networks using a common query method (e.g., a structured query language (SQL)-based query).

However, even if middleware supporting abstracting of sensor networks is used, PSNs are connected to the middleware. Thus, a user or application program should have basic information (e.g., an operation mode, and a supported sensing type) on respective sensor networks to be used, and should specify all the sensor networks to be used for a query. Also, when a user or application program is indifferent to a sensor node in a specific area among sensor nodes connected to a PSN, the user or application program should specify an area condition for a query, or select only required data after receiving sensing data from all the sensor nodes.

SUMMARY OF THE INVENTION

The present invention is directed to a method and system for providing a logical sensor network (LSN) that is separate from a physical sensor network (PSN) but useful for a user or application program in an environment consisting of the same or different types of PSNs and readily obtaining sensing data that the user or application program is interested in.

One aspect of the present invention provides a system for supporting a LSN including: a metadata database (DB) for storing metadata of a plurality of available PSNs each having a plurality of sensor nodes; a LSN generation module for generating a LSN including one or more PSNs among the PSNs stored in the metadata DB or one or more sensor nodes in the PSNs, and storing metadata of the generated LSN in the metadata DB; a LSN update module for updating the metadata of the LSN including the PSNs or the sensor nodes in the PSN when a state of the PSNs or the sensor nodes is changed; and a query processing module for, when a query about the LSN is received from an application program, collecting sensing data from the PSNs or the sensor nodes included in the LSN, generating query result data for the LSN using the collected data, and providing the query result data to the application program.

Another aspect of the present invention provides a method of supporting a LSN including: generating a new LSN including one or more PSNs or one or more sensor nodes in the PSNs, and storing metadata of the generated LSN in a metadata DB; when a state of the PSNs or the sensor nodes in the PSNs is changed, retrieving the metadata of the LSN including the PSNs or the sensor nodes from the metadata DB, and updating the metadata; and when a query about the LSN is received from an application program, collecting sensing data from the PSNs or the sensor nodes included in the LSN, generating query result data for the LSN using the collected data, and providing the query result data to the application program.

BRIEF DESCRIPTION OF THE DRAWINGS

The above and other objects, features and advantages of the present invention will become more apparent to those of ordinary skill in the art by describing in detail exemplary embodiments thereof with reference to the attached drawings, in which.

DETAILED DESCRIPTION OF EXEMPLARY EMBODIMENTS

Hereinafter, exemplary embodiments of the present invention will be described in detail. However, the present invention is not limited to the embodiments disclosed below but can be implemented in various forms. The following embodiments are described in order to enable those of ordinary skill in the art to embody and practice the present invention. To clearly describe the present invention, parts not relating to the description are omitted from the drawings. Like numerals refer to like elements throughout the description of the drawings.

Throughout this specification, when an element is referred to as being "connected" or "coupled" to another element, it can be directly connected or coupled to the other element or electrically connected or coupled to the other element with yet another element interposed between them.

Throughout this specification, when an element is referred to as "comprises," "includes," or "has" a component, it does not preclude another component but may further include the other component unless the context clearly indicates otherwise. Also, as used herein, the terms " . . . unit," " . . . device," " . . . module," etc., denote a unit of processing at least one function or operation, and may be implemented as hardware, software, or combination of hardware and software.

Figure 1:
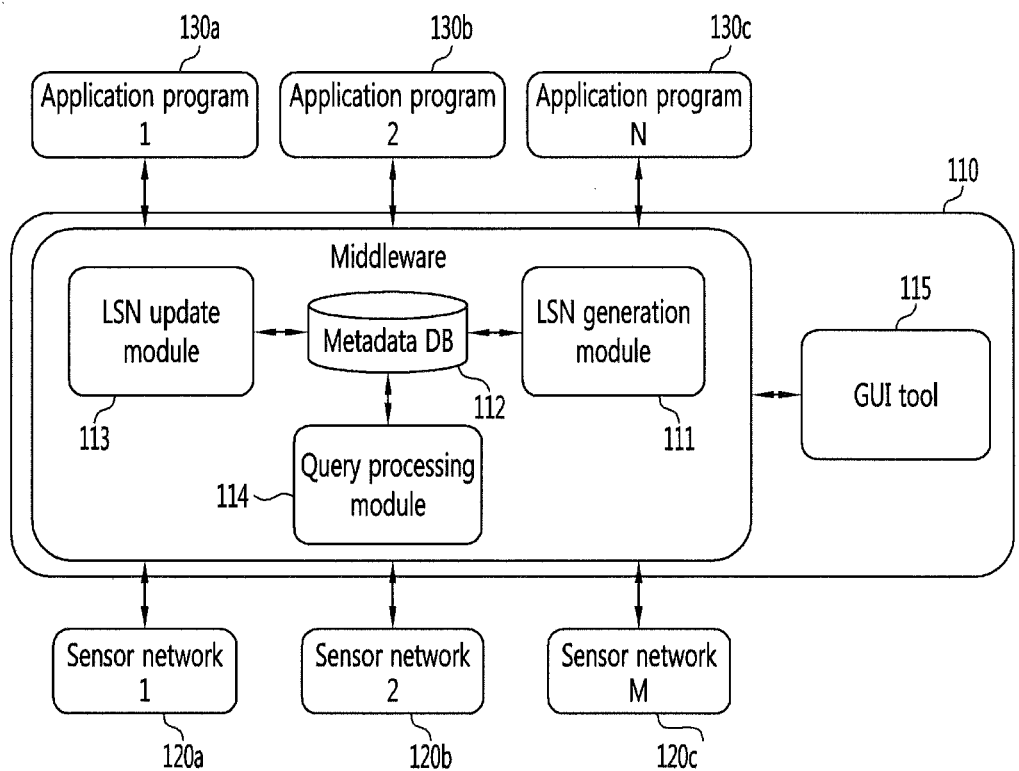
FIG. 1 is a block diagram of a system for supporting a logical sensor network (LSN) according to an exemplary embodiment of the present invention.

FIG. 1 is a block diagram of a system 110 for supporting a logical sensor network (LSN) according to an exemplary embodiment of the present invention. The LSN supporting system 110 is intended to support a LSN separate from physical sensor networks (PSNs) so that a plurality of application programs can readily obtain sensing data from the PSNs. Main components of the LSN supporting system 110 may be implemented as middleware between PSNs 120a, 120b and 120c and application programs 130a, 130b and 130c. The LSN supporting system 110 includes a LSN generation module 111, a metadata database (DB) 112, a LSN update module 113, a query processing module 114, and a graphical user interface (GUI) tool 115. The LSN generation module 111 generates a LSN including the one or more PSNs 120a, 120b and 120c or one or more sensor nodes in the PSNs 120a, 120b and 120c, and stores metadata of the generated LSN in the metadata DB 112. The metadata DB 112 stores metadata of the one or more PSNs 120a, 120b and 120c and one or more LSNs generated by the LSN supporting system 110. When the state of the PSN 120a, 120b or 120c or a sensor node in the PSN 120a, 120b or 120c is changed, the LSN update module 113 retrieves metadata of a LSN including the PSN or the sensor node from the metadata DB 112 and updates the metadata. The query processing module 114 receives a query about a LSN from the application programs 130a, 130b and 130c, processes the query, and provides a result of the query. The GUI tool 115 provides an input/output (I/O) interface so that an administrator can readily generate and manage a LSN.

The LSN generation module 111 examines whether one or more PSNs or sensor nodes selected by the administrator from among PSNs registered in the metadata DB 112 or sensor nodes in a PSN support a sensing type in common, and thereby determines whether or not a LSN can be generated. When it is determined that a LSN can be generated, the LSN generation module 111 generates a LSN including the selected PSNs or sensor nodes, and registers metadata of the generated LSN in the metadata DB 112. Metadata of a LSN may include a LSN identification (ID) (or name), information of a supported sensing type, and IDs of PSNs or sensor nodes included in the LSN. In an exemplary embodiment, a LSN ID (or name) may be input by the administrator through the GUI tool 115 when a new LSN is generated.

When the state of the PSN 120a, 120b or 120c or a sensor node is changed, such as addition of a new node to the PSN 120a, 120b or 120c, removal of an existing node from the PSN 120a, 120b or 120c, state change of a node, termination of a connection to the PSN 120a, 120b or 120c, and resumption of a connection to the PSN 120a, 120b or 120c, the LSN update module 113 retrieves metadata of a LSN including the PSN 120a, 120b or 120c or the sensor node from the metadata DB 112 and updates the metadata on the basis of the change.

In an exemplary embodiment, when a new node is added to a specific PSN, the LSN update module 113 retrieves metadata of all LSNs related to the PSN to which the node is added or the location of the added node from the metadata DB 112. The LSN update module 113 examines whether the node supports a sensing type supported by each of the LSNs, and adds the node to metadata of the corresponding LSN when the node supports the sensing type supported by the LSN. In addition, it may be determined whether the administrator has selected the entire PSN or only a specific node during generation of the LSN, and it may be selected by the administrator whether or not to add the added node to the LSN when only a specific node has been selected.

When a sensor node is removed from a certain PSN, the LSN update module 113 searches the metadata DB 112 and removes the node from metadata of all LSNs including the node.

When the state of a certain sensor node is changed, the LSN update module 113 searches the metadata DB 112 and changes the state of the node in information on all LSNs including the node.

After the connection of a certain PSN is terminated, the LSN update module 113 searches the metadata DB 112 and changes metadata of all LSNs including at least one node included in the PSN as follows: When it is allowed to terminate a part of PSNs during generation of a LSN, the LSN update module 113 changes the state of sensor nodes included in the terminated PSN in the LSN metadata into "non-operating" state. In this case, application programs can continuously use the LSN. On the other hand, when it is forbidden to terminate a part of PSNs during generation of a LSN, the LSN update module 113 changes the state of the LSN into "terminated connection" state so that application programs cannot use the LSN anymore.

When a PSN whose connection is terminated is connected again, the LSN update module 113 searches the metadata DB 112 and changes metadata of all LSNs including at least one node of the PSN as follows: When it is allowed to terminate a part of PSNs during generation of a LSN, the LSN update module 113 changes the state of sensor nodes of the connected PSN in metadata of the LSN into "operating" state. On the other hand, only if all PSNs included in the LSN are connected when it is forbidden to terminate a part of PSNs during generation of a LSN, the LSN update module 113 changes the state of the LSN into "connected" state so that application programs can use the LSN again.

The query processing module 114 receives a query about a LSN from the application programs 130a, 130b and 130c, processes the query, and provides a result of the query. A query generated by an application program is the same as a query about a PSN. Application programs generate a query without distinguishing between a PSN and a LSN. The generated query is processed by the query processing module 114 as follows: The query processing module 114 obtains information on a PSN related to the LSN about which the query is made or information on certain sensor nodes of the PSN from the metadata DB 112, obtains and collects sensing data from the PSN or sensor nodes in consideration of the operation mode (e.g., an asynchronization or synchronization mode) and/or processing capability (e.g., a continuous query processing capability, a condition comparison/processing capability, and an aggregate function processing capability) of the PSN, generates a result of the query, and provides the result to an application program generating the query. For example, when the PSN transfers sensing data in an asynchronous method, that is, the PSN does not transfer sensing data in response to a request but transfers sensing data by itself after a connection is made, the query processing module 114 obtains required sensing data from data that is received from the PSN and stored in middleware in advance. On the other hand, when the PSN transfers sensing data in a synchronous method, that is, in response to a request, the query processing module 114 requests and processes sensing data in consideration of the processing capability (e.g., the continuous query processing capability, the condition comparison/processing capability, and the aggregate function processing capability) of the PSN.

For example, when the generated query is a continuous query, which requests sensing data according to a given time period, the query processing module 114 determines whether the PSN can process a continuous query. When the PSN cannot directly process a continuous query, the query processing module 114 requests and obtains sensing data from the PSN at the given time intervals. When the generated query includes a condition comparison (e.g., a request for sensing data whose temperature is ten degrees or more) but the PSN cannot directly process the condition comparison, the query processing module 114 requests all sensing data from the PSN without conditions and then filters the obtained sensing data according to the condition. When the generated query includes an aggregate function (e.g., MAXIMUM, MINIMUM, AVERAGE, and SUM) but the PSN cannot directly process the aggregate function, the query processing module 114 requests all sensing data from the PSN without the aggregate function and then processes the obtained sensing data according to the aggregate function. When the PSN can directly process the aggregate function, the query processing module 114 requests a process result based on the aggregate function from the PSN. However, when the aggregate function is the AVERAGE function and an overall average cannot be calculated from several averages, the query processing module 114 converts the aggregate function into the SUM function and the COUNT function and requests a process result based on the functions from the PSN.

The query processing module 114 obtains and collects sensing data from all PSNs included in the LSN, generates query result data for the LSN, and provides the query result data to the application program generating the query.

The GUI tool 115 provides an I/O interface so that a user or administrator can readily generate and manage a LSN. In an exemplary embodiment, when the administrator wants to generate a LSN, the GUI tool 115 provides the list of at least one PSN currently registered in the metadata DB 112 to the administrator so that the administrator can select a PSN to be included in the LSN or sensor nodes included in a PSN. In another exemplary embodiment, when the administrator wants to generate a LSN, the GUI tool 115 displays a map, in which the locations of sensor nodes of a PSN registered in the metadata DB 112 are indicated, on a screen so that the administrator can select an attention area in which the LSN is desired to be generated using a mouse. Also, the GUI tool 115 may provide an interface through which the ID or name of the new LSN can be input to the administrator.

Figure 2:
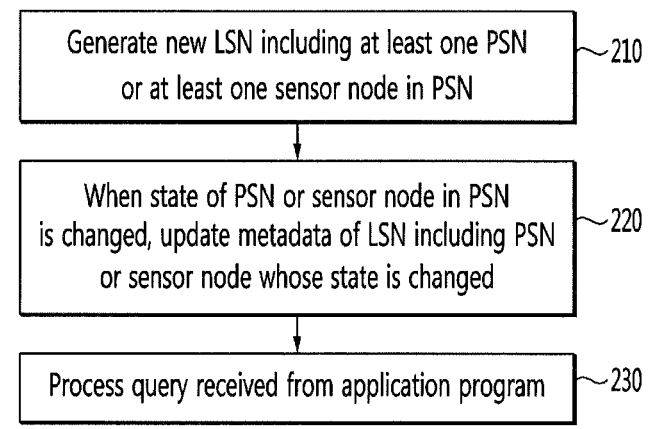
FIG. 2 is a flowchart illustrating a method of supporting a LSN according to an exemplary embodiment of the present invention.

FIG. 2 is a flowchart illustrating a method of supporting a LSN according to an exemplary embodiment of the present invention. Although FIG. 2 illustrates operations 210 to 230 in sequence, the sequence is for convenience. An exemplary embodiment of the present invention is not limited by the sequence, and it is to be understood by those of ordinary skill in the art that the respective operations can be separately performed according to a request of an administrator or a change in system environment.

In operation 210, a new LSN including at least one PSN or at least one sensor node included in a PSN is generated. When one or more PSNs to be included in the LSN that the administrator wants to generate or one or more sensor nodes included in a PSN are selected in PSN units or node units from among available PSNs stored in the metadata DB 112 in advance, it is examined whether the selected PSNs or sensor nodes support a sensing type in common. When the selected PSNs or sensor nodes support a sensing type in common, a LSN including the selected PSNs or sensor nodes is generated. Metadata of the generated LSN is stored in the metadata DB 112. A new LSN may be generated in various ways according to a method in which the administrator selects the PSNs or sensor nodes. These methods will be described later in detail with reference to FIGS. 3 and 4.

In operation 220, when the state of a PSN or a sensor node included in a PSN is changed, metadata of a LSN including the PSN or sensor node whose state is changed is updated. The state of a PSN or a sensor node included in a PSN is changed when, for example, a new node is added to the PSN, an existing node is removed from the PSN, the state of the node is changed, a connection to the PSN is terminated, and a connection to the PSN is resumed.

In operation 230, when a query about a LSN is received from an application program, sensing data is collected from PSNs or sensor nodes included in the LSN, and query result data for the LSN is generated using the collected data and provided to the requesting application program. Sensing data may be collected from a PSN or sensor node in consideration of the operation mode (e.g., the asynchronization or synchronization mode) and/or processing capability (e.g., the continuous query processing capability, the condition comparison/processing capability, and the aggregate function processing capability) of the PSN. As an example, when the PSN operates in the asynchronous method, required sensing data may be obtained from data that is received from the PSN and stored in middleware in advance. As another example, when the generated query is a continuous query, which requests sensing data according to a given time period, it is determined whether the PSN can process a continuous query. When the PSN cannot directly process a continuous query, sensing data may be requested and obtained from the PSN at the given time intervals.

Figure 3:
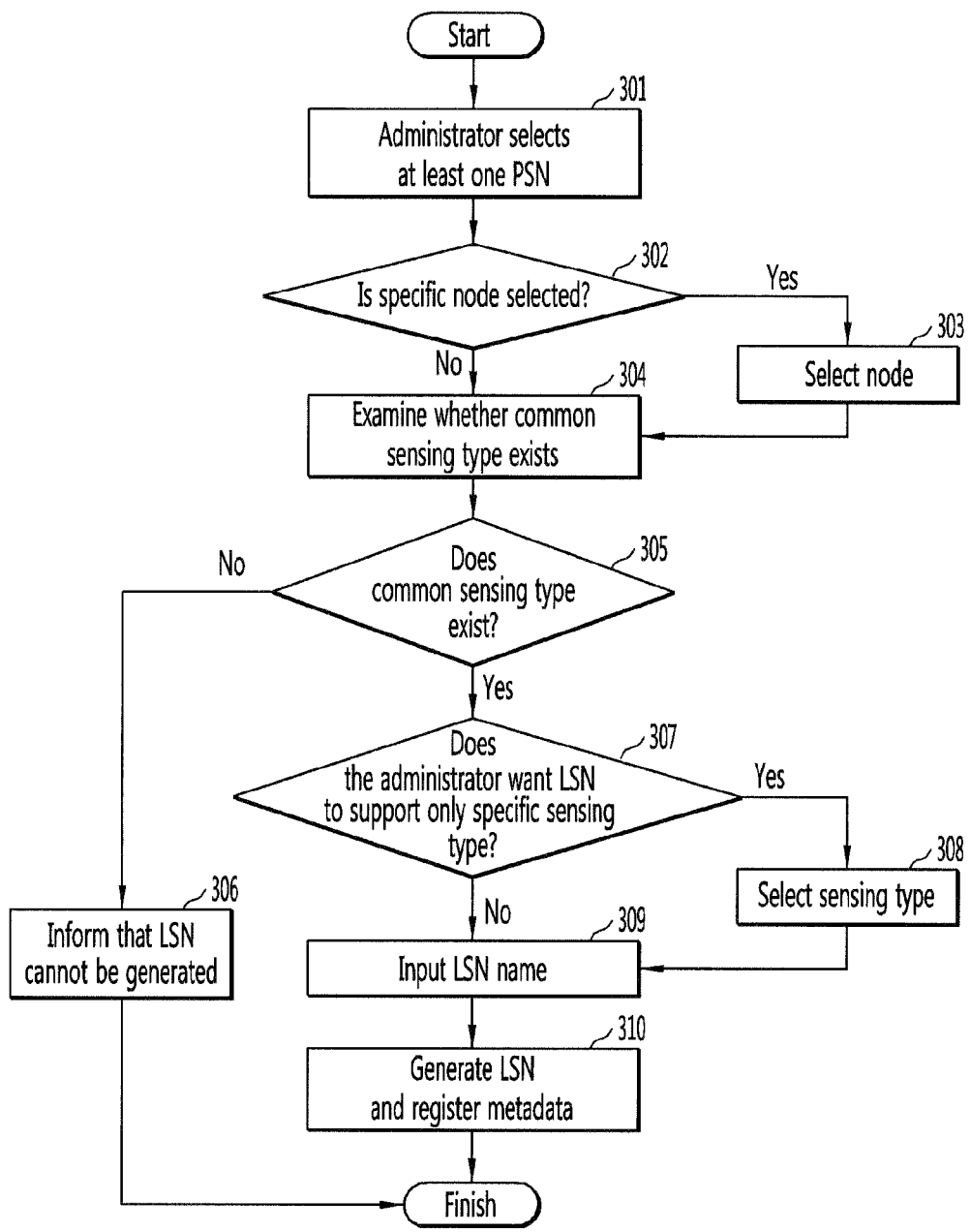
FIG. 3 is a flowchart illustrating a process of an administrator generating a new LSN by manually selecting a physical sensor network (PSN) or a specific sensor node in a PSN according to a first exemplary embodiment of the present invention.

FIG. 3 is a flowchart illustrating a process of an administrator generating a new LSN by manually selecting a PSN or a specific sensor node in a PSN according to a first exemplary embodiment of the present invention. First, an administrator selects at least one PSN from among PSNs currently registered in the metadata DB 112 through the GUI tool 115 (301). It is determined whether only specific nodes among sensor nodes included in the selected PSN are desired to be included in the new LSN (302). When the administrator wants to include only specific nodes in the new LSN, the administrator selects only the specific nodes through the GUI tool 115 (303). The GUI tool 115 transfers information on the selected nodes to the LSN generation module 111 and asks whether or not the LSN can be generated. When specific nodes are not selected, it is assumed that all nodes included in the selected PSN are selected.

In operation 304, the LSN generation module 111 examines whether the selected nodes support a sensing type in common. When it is determined in operation 305 that the selected nodes do not support a sensing type in common, the LSN generation module 111 informs the GUI tool 115 that the LSN cannot be generated (306). When it is determined in operation 305 that the selected nodes support at least one sensing type in common, the LSN generation module 111 transfers the corresponding sensing type information to the GUI tool 115 and informs the administrator that the LSN supporting the common sensing type can be generated. For example, when all the selected nodes support sensing types "temperature," "humidity," and "atmospheric pressure" and only some of the nodes support a sensing type "wind speed," the LSN generation module 111 transfers {"temperature," "humidity," and "atmospheric pressure"} to the GUI tool 115. When the administrator wants the new LSN to support only a part of the common sensing types (307), the administrator selects a desired sensing type through the GUI tool 115 (308). Since only a sensing type that the administrator wants can be selected, the LSN may be generated and used to hide a specific sensing type of one PSN.

Finally, when the administrator inputs a unique ID (or name) of the LSN to be generated through the GUI tool 115 (309), the GUI tool 115 transfers the selected sensing type and the input ID to the LSN generation module 111. The LSN generation module 111 generates the new LSN and registers the corresponding information in the metadata DB 112 (310). Application programs can use the LSN on the basis of the information registered in the metadata DB 112 in the same way as PSNs.

Figure 4:
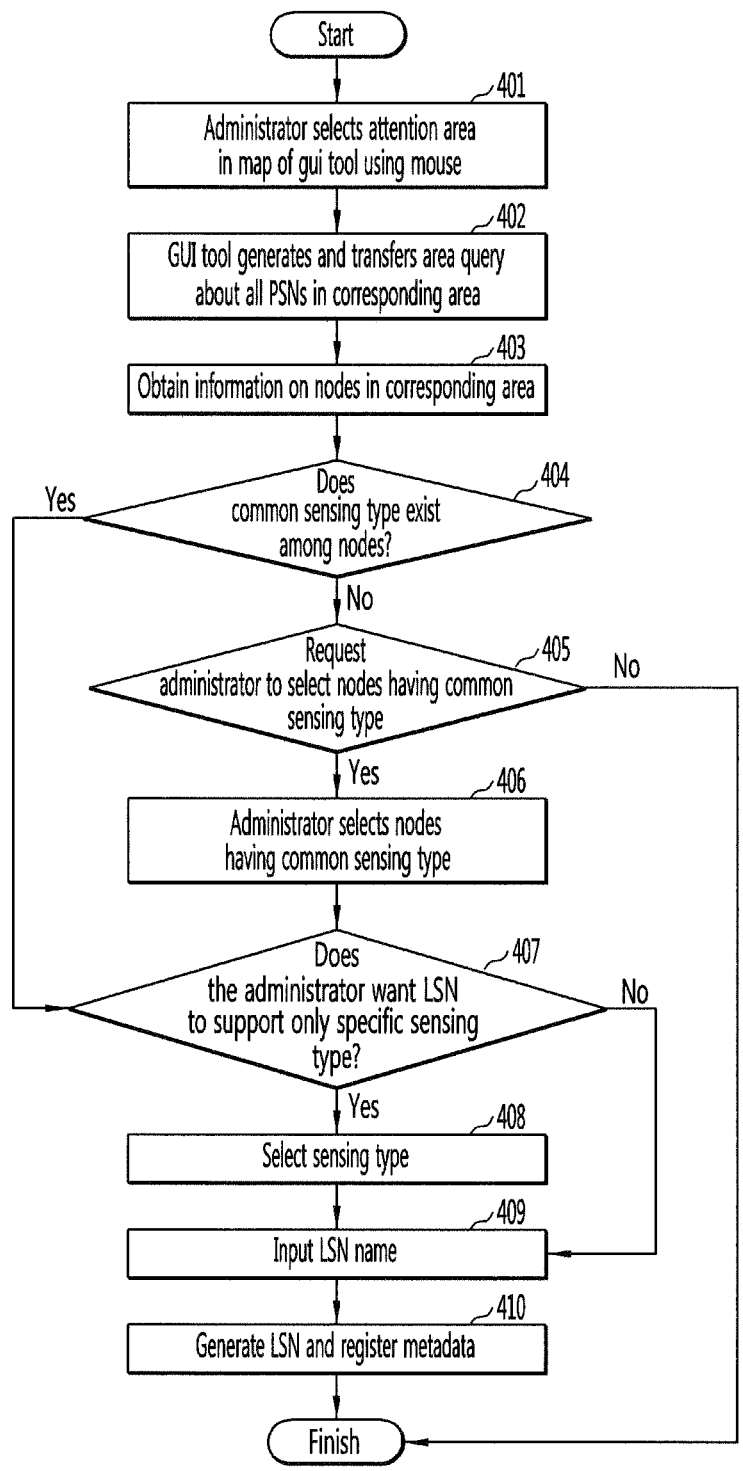
FIG. 4 is a flowchart illustrating a process of an administrator generating a new LSN by selecting a map area or using an area query according to a second exemplary embodiment of the present invention.

FIG. 4 is a flowchart illustrating a process of an administrator generating a new LSN by selecting a map area or using an area query according to a second exemplary embodiment of the present invention.

An administrator selects an attention area in which a LSN is desired to be generated in a map provided by the GUI tool 115 using a mouse (401). In the map, the locations of sensor nodes are indicated. The GUI tool 115 generates an area query that requests information on all sensor nodes included in the selected attention area. Alternatively, when the GUI tool 115 does not provide a map, the administrator may manually input an area query.

The LSN generation module 111 transfers the area query that is automatically generated by the GUI tool 115 or manually input by the administrator to the query processing module 114 (402), and obtains information on all sensor nodes included in the corresponding area from the query processing module 114 (403).

Subsequently, the LSN generation module 111 examines whether the sensor nodes support a sensing type in common (404). When the sensor nodes do not support a sensing type in common, the LSN generation module 111 requests the administrator to select nodes having a common sensing type through the GUI tool 115 (405). At this time, the LSN generation module 111 informs that, for example, nodes supporting sensing types "temperature" and "humidity" are node 1 and node 2, or nodes supporting only a sensing type "temperature" are node 1, node 2, and node 3 so that the administrator can readily select nodes. After nodes supporting a common sensing type are selected (406), when the administrator wants a new LSN to support only a part of common sensing types (407), only a desired sensing type can be selected through the GUI tool 115 (408).

When the administrator inputs a unique ID (or name) of a LSN to be generated through the GUI tool 115 (409), the GUI tool 115 transfers information of the selected sensing type and the input ID to the LSN generation module 111. The LSN generation module 111 generates a new LSN and then registers the corresponding information in the metadata DB 112 (410). Application programs can use the LSN on the basis of the information registered in the metadata DB 112 in the same way as PSNs.

Figure 5:
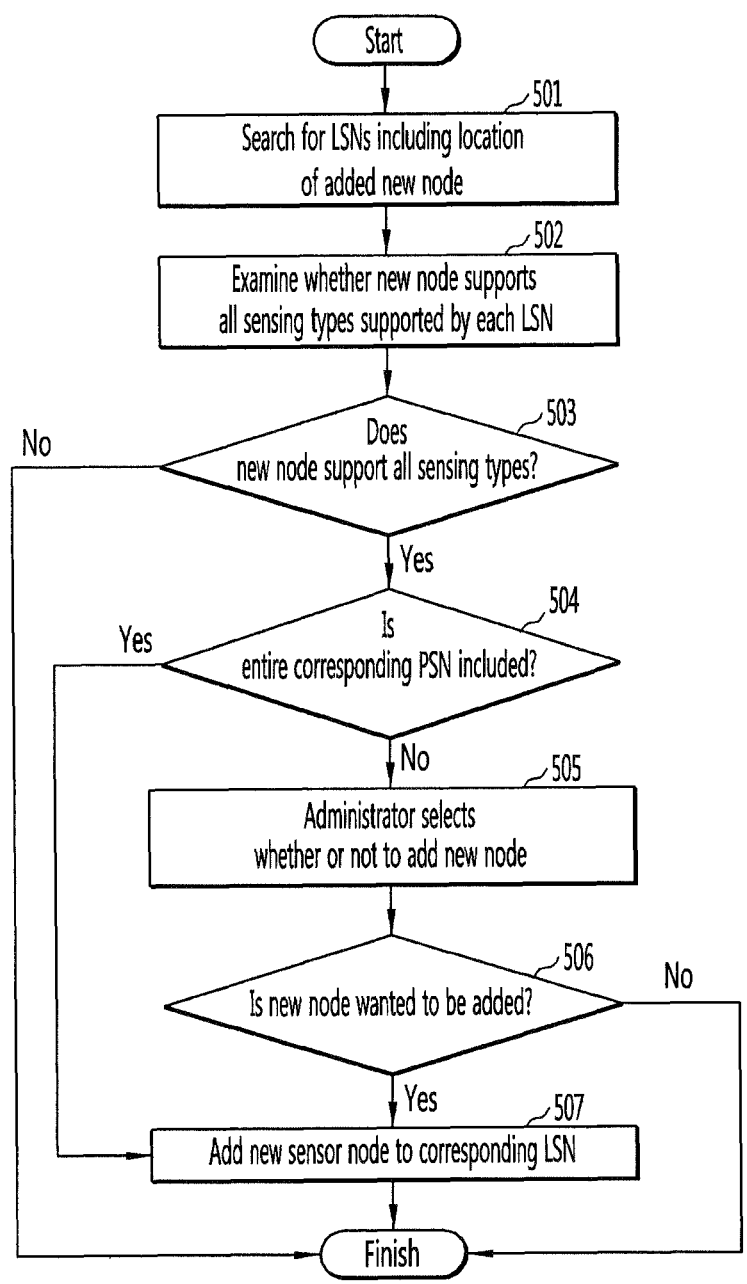
FIG. 5 is a flowchart illustrating a process of adding a new node to a LSN when the new node is added to a PSN according to the first exemplary embodiment of the present invention.

FIG. 5 is a flowchart illustrating a process of adding a new node to a LSN when the new node is added to a PSN according to the first exemplary embodiment of the present invention.

When a new node is added, the LSN update module 113 retrieves all LSNs including a PSN including the node from the metadata DB 112 (501). In operation 502, it is examined whether the new node supports all sensing types that each of the retrieved LSNs supports. When it is determined in operation 503 that the new node does not support all the sensing types, the node is not added to the corresponding LSN. On the other hand, when it is determined in operation 503 that the new node supports all the sensing types, it is examined whether the administrator has selected the entire PSN, that is, has not selected only a specific node during generation of the corresponding LSN (504). When the entire PSN has been selected during generation of the LSN, the node is directly added to the LSN and reflected in the metadata DB 112 (507). When only a specific node of the PSN has been selected during generation of the LSN, it is selected by the administrator whether or not to add the node through the GUI tool 115 (505). When it is selected by the administrator to add the node in operation 505, the node is added to the LSN and reflected in the metadata DB 112 (507).

Figure 6:
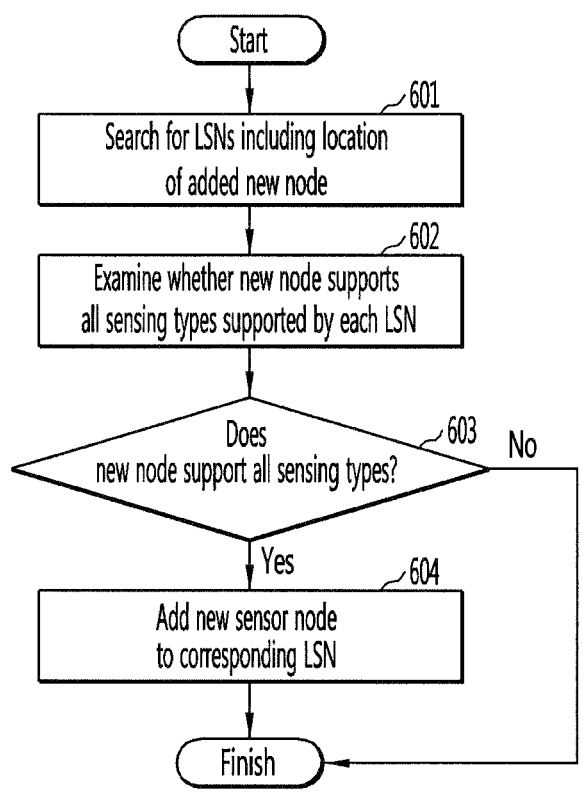
FIG. 6 is a flowchart illustrating a process of adding a new node to a LSN when the new node is added to a PSN according to the second exemplary embodiment of the present invention.

FIG. 6 is a flowchart illustrating a process of adding a new node to a LSN when the new node is added to a PSN according to the second exemplary embodiment of the present invention.

When a new node is added, the LSN update module 113 retrieves all LSNs including the location of the node from the metadata DB 112 (601). It is examined whether the node supports all sensing types that each of the LSNs supports (602). When it is determined in operation 603 that the node does not support all the sensing types, the node is not added to the corresponding LSN. On the other hand, when it is determined in operation 603 that the node supports all the sensing types, the node is added to the LSN and reflected in the metadata DB 112 (604).

In an exemplary embodiment of the present invention, an application program can obtain required sensing data through a LSN that is useful for the application program itself separately from a PSN. Even if the required sensing data is obtained from different types of sensor networks, the application program can obtain the sensing data through the LSN regardless of the difference between the sensor networks.

Also, since various logical meanings can be given to one PSN, resources can be efficiently used. Furthermore, an administrator can disclose only sensing types required for respective application programs and thus can prevent use of forbidden resources.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A system for supporting a logical sensor network (LSN), comprising:
   a computer having a memory, comprising
   a metadata database (DB) for storing metadata of a plurality of available physical sensor networks (PSNs) each having a plurality of sensor nodes;
   a LSN generation module for generating a LSN including one or more PSNs among the PSNs stored in the metadata DB or one or more sensor nodes in the PSNs, and storing metadata of the generated LSN in the metadata DB;

a LSN update module for updating the metadata of the LSN including the PSNs or the sensor nodes in the PSNs when a state of the PSNs or the sensor nodes is changed; and a query processing module for, when a query about the LSN is received from an application program, collecting sensing data from the updated PSNs or the sensor nodes included in the LSN, generating query result data for the LSN using the collected data, and providing the query result data to the application program, wherein the LSN generation module determines whether or not a LSN is generated by examining whether the selected PSNs or sensor nodes support a sensing type in common;

wherein the LSN generation module generates the LSN using the selected PSNs or sensor nodes when the selected PSNs or sensor nodes support a sensing type in common, and stores metadata of the generated LSN in the metadata DB.

2. The system of claim 1, further comprising a graphical user interface (GUI) tool for providing an input/output (I/O) interface to enable an administrator to readily manage the LSN.

3. The system of claim 2, wherein the GUI tool shows the administrator a list of the PSNs stored in the metadata DB and enables the administrator to select one or more PSNs to include in the LSN from among the one or more PSNs or one or more sensor nodes in the PSNs.

4. The system of claim 1, wherein the metadata of the LSN includes a LSN identification (ID), information on a supported sensing type, and IDs of the PSNs or sensor nodes included in the LSN.

5. The system of claim 1, wherein the LSN update module retrieves LSNs including a PSN to which a new sensor node is added or LSNs related to a location of the added sensor node from the metadata DB, examines whether the added sensor node supports a sensing type supported by each of the retrieved LSNs, and adds the sensor node to the corresponding LSN when the added sensor node supports the sensing type supported by the LSN.

6. The system of claim 1, wherein when a sensor node in the PSNs is removed, the LSN update module retrieves a LSN including the sensor node from the metadata DB and deletes information on the sensor node from metadata of the retrieved LSN.

7. The system of claim 1, wherein when a state of a sensor node in the PSNs is changed, the LSN update module retrieves a LSN including the sensor node from the metadata DB and changes state information on the sensor node in metadata of the retrieved LSN.

8. The system of claim 1, wherein when a query about a specific LSN is received from the application program, the query processing module retrieves information on a PSN or a sensor node included in the specific LSN from the metadata DB, obtains and collects sensing data from the retrieved PSN or sensor node, and generates a result of the query using the collected data.

9. The system of claim 8, wherein the query processing module obtains and collects sensing data from the retrieved PSN or sensor node in consideration of at least one of an operation mode and a processing capability of the retrieved PSN or sensor node.

10. A method of supporting a logical sensor network (LSN), comprising:

generating a new LSN including one or more physical sensor networks (PSNs) or one or more sensor nodes in the PSN, and storing metadata of the generated LSN in a metadata database (DB);

retrieving the metadata of the LSN including the PSNs or the sensor nodes from the metadata DB, and updating the metadata;

collecting sensing data from the PSNs or the sensor nodes included in the LSN, generating query result data for the LSN using the collected data, and providing the query result data to the application program, whenever a query about the LSN is received from an application program, wherein generating the new LSN and storing the metadata of the generated LSN includes: showing an administrator a list of available PSNs stored in the metadata DB, and enabling the administrator to select one or more PSNs to include in the new LSN or one or more sensor nodes in the PSNs; and examining whether the selected nodes support a sensing type in common, transferring a corresponding sensing type information to a GUI tool to informs the administrator that the LSN supporting the common sensing type can generate.

11. The method of claim 10, wherein generating the new LSN and storing the metadata of the generated LSN includes:
displaying a map in which locations of a plurality of sensor nodes in PSNs stored in the metadata DB are indicated on a screen;
obtaining information on all sensor nodes included in the selected area from the metadata DB when an area in which the LSN is generated is selected by an administrator;
examining whether all the sensor nodes support a sensing type in common on the basis of the obtained information; and
transferring a corresponding sensing type information to a GUI tool to informs the administrator that the LSN supporting the common sensing type can generate.

12. The method of claim 10, wherein generating the new LSN and storing the metadata of the generated LSN includes:
receiving an area query requesting information on all sensor nodes included in an area in which the LSN is generated from an administrator;
obtaining information on all the sensor nodes included in the area from the metadata DB in response to the area query received from the administrator; and
determining whether or not the LSN is generated by examining whether all the sensor nodes support a sensing type in common, transferring a corresponding sensing type information to a GUI tool to informs the administrator that the LSN supporting the common sensing type can generate.

13. The method of claim 10, further comprising enabling the administrator to select a sensing type when the PSNs or the sensor nodes support a plurality of sensing types in common.

14. The method of claim 10, wherein the change in a state of the PSNs or the sensor nodes in the PSNs includes addition of a sensor node, removal of a sensor node, state change of a sensor node, termination of a connection to the PSNs, and resumption of a connection to the PSNs.

15. The method of claim 14, wherein when a sensor node is added to a PSN, retrieving and updating the metadata includes:
retrieving all LSNs including the PSN to which the sensor node is added from the metadata DB; and
examining whether the added sensor node supports a sensing type supported by each of the LSNs, and adding the added sensor node to the corresponding LSN when the added sensor node supports the sensing type.

* * * * *